(12) United States Patent
Moore, Jr.

(10) Patent No.: US 7,460,525 B2
(45) Date of Patent: Dec. 2, 2008

(54) METHODS, APPARATUS, AND SYSTEMS FOR ACCESSING MOBILE AND VOICE OVER IP TELEPHONE NETWORKS WITH A MOBILE HANDSET

(75) Inventor: Richard Moore, Jr., Harleysville, PA (US)

(73) Assignee: General Instrument Corporation, Horsham, PA (US)

( * ) Notice: Subject to any disclaimer, the term of this patent is extended or adjusted under 35 U.S.C. 154(b) by 1703 days.

(21) Appl. No.: 10/180,988

(22) Filed: Jul. 2, 2002

(65) Prior Publication Data
US 2003/0039242 A1 Feb. 27, 2003

Related U.S. Application Data

(60) Provisional application No. 60/303,614, filed on Jul. 6, 2001.

(51) Int. Cl.
*H04L 12/66* (2006.01)
(52) U.S. Cl. ......................... 370/354; 370/338
(58) Field of Classification Search ........................ None
See application file for complete search history.

(56) References Cited

U.S. PATENT DOCUMENTS

| | | | |
|---|---|---|---|
| 4,989,230 A | 1/1991 | Gillig et al. | |
| 5,999,823 A | 12/1999 | Yoneyama et al. | |
| 6,035,193 A | 3/2000 | Buhrmann et al. | |
| 6,085,109 A | 7/2000 | Koga | |
| 6,141,547 A | 10/2000 | Rousseau et al. | |
| 6,167,271 A | 12/2000 | Parker et al. | |
| 6,167,278 A | 12/2000 | Nilssen | |
| 6,600,734 B1 * | 7/2003 | Gernert et al. | 370/352 |
| 6,795,444 B1 * | 9/2004 | Vo et al. | 370/401 |
| 7,295,844 B1 * | 11/2007 | Moon et al. | 455/445 |
| 2002/0164998 A1 * | 11/2002 | Younis | 455/456 |
| 2005/0036460 A1 * | 2/2005 | Dougherty et al. | 370/328 |
| 2006/0153214 A1 * | 7/2006 | Moore et al. | 370/401 |

FOREIGN PATENT DOCUMENTS

| | | |
|---|---|---|
| EP | 1 011 278 | 6/2000 |
| EP | 1 257 132 | 11/2002 |
| WO | 01/67684 | 9/2001 |

OTHER PUBLICATIONS

Albrecht, M., et al., "IP Services over Bluetooth: Leading the Way to a New Mobility", XP-001001314, IEEE 1999, pp. 2-11.

* cited by examiner

*Primary Examiner*—Phirin Sam
(74) *Attorney, Agent, or Firm*—Larry T. Cullen (57) ABSTRACT

Methods, systems, and apparatus are provided to enable access to mobile and voice over IP (VoIP) telephone networks with a mobile handset. A VoIP gateway for the VoIP telephone network is provided. A cable modem allows communication between the handset and the VoIP telephone network via the VoIP gateway. A local network connects the handset to the VoIP gateway. The mobile handset determines whether it is within range of the local network. If the handset is within the range of the local network, data traffic may be routed to and from the handset via the VoIP telephone network. If the handset is outside of the range of the local network, data traffic may be routed to and from the handset via the mobile telephone network. The data traffic may comprise telephony data traffic and/or Internet protocol (IP) data traffic.

57 Claims, 2 Drawing Sheets

METHODS, APPARATUS, AND SYSTEMS FOR ACCESSING MOBILE AND VOICE OVER IP TELEPHONE NETWORKS WITH A MOBILE HANDSET

This application claims the benefit of U.S. provisional patent application No. 60/303,614, filed Jul. 6, 2001.

FIELD OF THE INVENTION

The present invention relates to the communications field. More particularly, the present invention is directed to methods, apparatus, and systems which allow a mobile handset to automatically route telephony and Internet Protocol (IP) data traffic to either a Voice Over IP (VoIP) network (or other network) or a mobile telephony network based on whether the mobile handset is within range of a residential VoIP gateway.

BACKGROUND OF THE INVENTION

Hybrid Fiber-Coax (HFC) network operators are providing telephony services using Voice Over Internet Protocol (VoIP) and Data Over Cable Service Interface Specification (DOCSIS) and may want to provide services having the same or higher level of availability than that of the competing Local Exchange Carrier (LEC) or other telephony service provider. However, the capital outlay required by the HFC network operator to provide backup network powering for the plant, and Internet Protocol (IP) Network path redundancy at every point can be so large that the business case for providing that service would be prohibitive. So, an alternative for the HFC operator is to co-market his VoIP telephony service with a mobile network operator.

Another motivation is to allow subscriber to have incoming and outgoing calls placed from his handset automatically use the local VoIP access network when the subscriber is at home. Such capabilities would be financially advantageous to the subscriber if telephone calls are cheaper when made on the VoIP network than on the mobile network, or if the subscriber wants to manage use of his or her mobile minutes.

Both the HFC network and mobile network operators have an interest in attracting and retaining telephony subscribers. The resources and capabilities of the HFC broadband network and its back-end IP-based services, along with those of the mobile telephony and data abilities of the mobile network, can be combined to create service offerings that will attract and retain subscribers. The services provided by the combination of both types of networks would be able to achieve capabilities that 3G (third generation) cellular telephony is promising in the future. The present invention facilitates the realization of those future services on today's networks.

It would be advantageous to provide methods and systems for integrating mobile and VoIP telephone networks. It would be further advantageous to provide a system where a single mobile handset can access either a VoIP telephone network or a mobile telephone network, depending on the location of the mobile handset. For example, it would be advantageous if such a mobile handset could access the VoIP telephone network when it is determined to be within a range of a local network of a VoIP gateway to the VoIP network and access the mobile telephone network when it is outside the range of the local network. It would be advantageous if such a system provided for the routing of telephone data traffic and IP data traffic to a mobile handset over either the mobile telephone network or the VoIP telephone network, depending on the location of the mobile handset.

The methods, apparatus, and systems of the present invention provide the foregoing and other advantages.

SUMMARY OF THE INVENTION

The present invention provides methods, apparatus, and systems which allow a mobile handset to automatically route telephony and Internet Protocol (IP) data traffic to either a Voice Over IP (VoIP) network (or other network) or a mobile telephony network based on whether the mobile handset is within range of a residential VoIP gateway.

Methods, systems, and apparatus are provided to enable access to mobile and voice over IP (VoIP) telephone networks with a mobile handset. A VoIP gateway for the VoIP telephone network is provided. A cable modem allows communication between the handset and the VoIP telephone network via the VoIP gateway. A local network is provided for connecting the handset to the VoIP gateway. The mobile handset is enabled to determine whether it is within range of the local network. If the handset is within the range of the local network, data traffic may be routed to and from the handset via the VoIP telephone network. If the handset is outside of the range of the local network, data traffic may be routed to and from the handset via the mobile telephone network. The data traffic may comprise telephony data traffic and/or Internet protocol (IP) data traffic.

BRIEF DESCRIPTION OF THE DRAWINGS

The present invention will hereinafter be described in conjunction with the appended drawing figures, wherein like numerals denote like elements, and.

DETAILED DESCRIPTION OF THE INVENTION

The ensuing detailed description provides preferred exemplary embodiments only, and is not intended to limit the scope, applicability, or configuration of the invention. Rather, the ensuing detailed description of the preferred exemplary embodiments will provide those skilled in the art with an enabling description for implementing a preferred embodiment of the invention. It should be understood that various changes may be made in the function and arrangement of elements without departing from the spirit and scope of the invention as set forth in the appended claims.

The present invention creates a bridge between the services provided by broadband network providers (such as AOL-Time Warner Cable) and mobile network operators (such as Nextel Communications). It allows those types of companies to combine their service offerings for a more powerful and compelling set of integrated voice and data services for both residential and mobile use. The IP Networking and Java capabilities of today's mobile handsets, combined with the high speed data and voice capabilities of broadband networks, creates a new environment for applications that transcend the wired and wireless worlds. For example, the mobile handset of the present invention can be used to access and control residential control systems like home security systems, audio and video systems, air conditioning and heating systems, applications hosted by the home personal computer, and the like. The IP-based mobile handset would utilize a VoIP gateway to access a local home network and interface to all of those home-based systems and applications. When the handset is in range of the local home network, it would utilize the local home network to interact with the VoIP gateway (for example, Bluetooth™). When the mobile handset is outside the range of the local home network (i.e. the user is away from home), the IP networking capabilities of the mobile telephone network would be used to route IP traffic to the VoIP gateway through the broadband network. With the present invention, all of the same capabilities to access residential control systems and applications are available to the user whether the user is in range of the local home network, or away from it. Such capabilities include all of the so-called advanced telephony features, e.g., call forwarding, call rejection, three-way calling, caller ID, and the like Subscribers would be provided a VoIP gateway for the home, and a mobile handset that works with both the VoIP gateway and the mobile network depending on where the handset is. If the mobile handset is within range of the local wireless network of the VoIP gateway, it acts as a cordless phone and uses the VoIP gateway to make and receive calls. If the VoIP network has a failure that prevents telephony, then the mobile handset resorts to the mobile network. The control of incoming call routing is achieved by having the handset automatically instructing the mobile network to enable or disable call forwarding to the VoIP Network phone number. In this way, the mobile network is acting as a backup network to the HFC VoIP network.

The protocols used to implement the present invention may include one or more of the following:

- Mobile telephony call signaling (e.g., the iDEN Network, TDMA, CDMA, CDMA-2000, GSM, and the like).
- IP-based Telephony Signaling (e.g., Packet Cable Network-based Call Signaling (NCS), Packet Cable Duos, SIP, SGCP, MGCP, H.323, and the like)
- The Public Switched Telephone Network (PSTN).
- Local network interfaces that supports voice and data traffic. Such local networks include, but are not limited to Bluetooth™, IEEE 802.11b, IEEE 802.11a, IEEE 802.11g, IEEE 802.11h, IEEE 802.11e, and HomeRF. The invention also can also apply to mobile handsets that can connect to a wired local network like the Home Phone line Networking Alliance (HPNA), Home Plug, 10/100BaseT Ethernet, USB, IEEE 1394, and the like.
- Broadband networking including hybrid-fiber coax network. The area of hybrid-fiber coax networks includes DOCSIS compliant protocols and IP Telephony protocols.
- Digital Subscriber Line (DSL) Modems and Networks.
- Fixed Wireless Networks (e.g., MMDS, LMDS, and the like).
- Bluetooth™ Protocol Specification.
- PacketCable NCS Signaling Specification.

Figure 1:
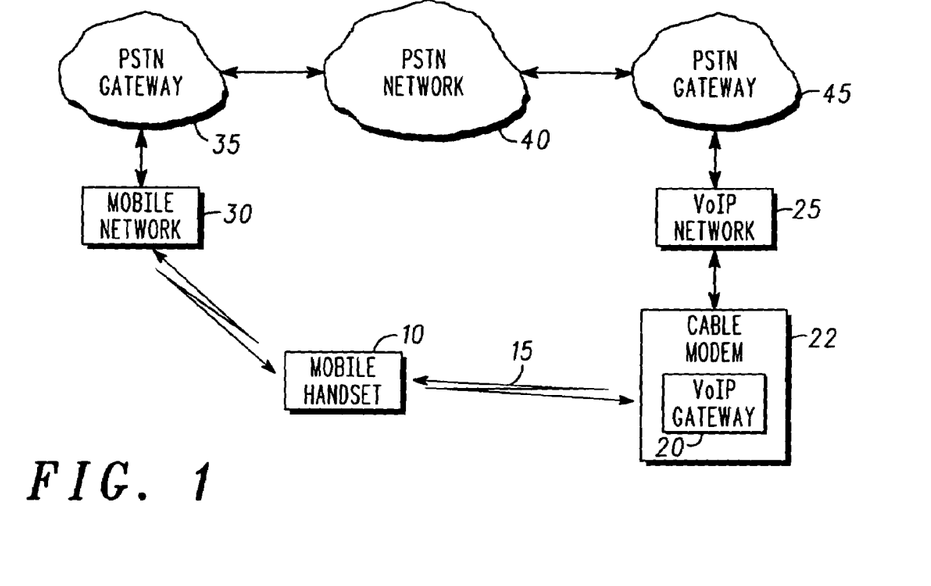
FIG. 1 shows a block diagram of an example embodiment of the invention.

In an example embodiment of the invention as shown in FIG. 1, a system is provided for accessing mobile and voice over IP (VoIP) telephone networks with a mobile handset 10. A VoIP gateway 20 for the VoIP telephone network 25 is provided. A cable modem 22 allows communication between the handset 10 and the VoIP telephone network 25 via the VoIP gateway 20. A local network 15 is provided for connecting the handset 10 to the VoIP gateway 20. The mobile handset 10 is enabled to determine whether it is within range of the local network 15. If the handset 10 is within the range of the local network 15, data traffic may be routed to and from the handset 10 via the VoIP telephone network 25. If the handset 10 is outside of the range of the local network 15, data traffic may be routed to and from the handset 10 via the mobile telephone network 30.

Figure 2:
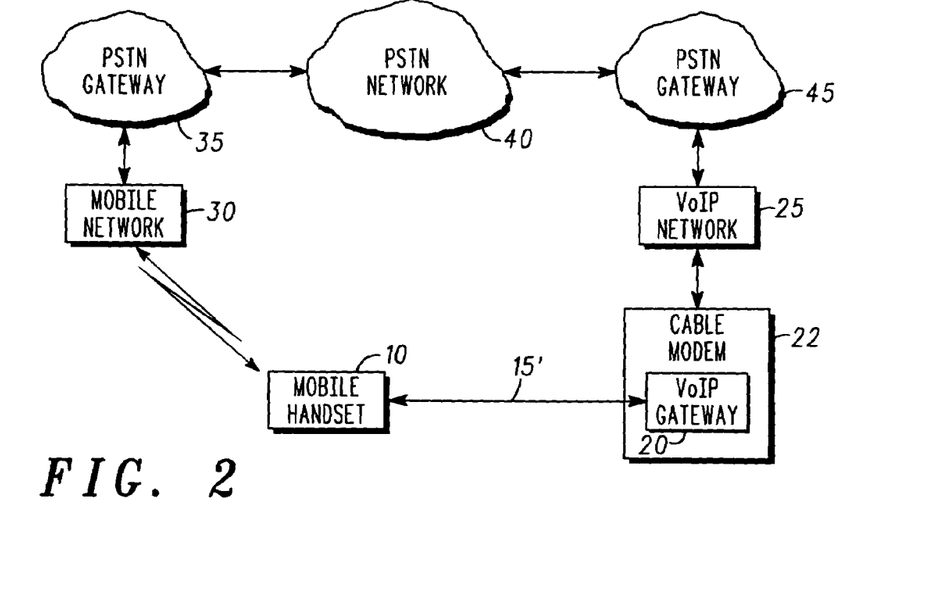
FIG. 2 shows a block diagram of a further example embodiment of the invention.

The local network may comprise a wireless local network 15 as shown in FIG. 1. In an alternate embodiment of the invention, the local network may comprise a wired network 15' as shown in FIG. 2. The handset 10 is determined to be within range of the local network when the handset is either physically connected to the wired local network 15' or is within a predetermined distance of the wireless local network 15.

The data traffic may comprise at least one of telephony data traffic and Internet protocol (IP) data traffic. In an example embodiment where the data traffic comprises telephony traffic, telephone calls may be forwarded from the mobile telephone network 30 to the VoIP telephone network 25 (e.g., through the Public Switched Telephone Network (PSTN) 40 via PSTN gateways 35 and 45) when the handset 10 is within the range of the local network 15. The forwarding of telephone calls may be disabled when the handset 10 is outside the range of the local network 15.

To enable the forwarding of telephone calls from the mobile telephone network 30 to the VoIP telephone network 25, the handset 10 may first request the telephone number of the VoIP gateway 20 (e.g., over local network 15), and then send a command to the mobile telephone network 30 instructing the mobile telephone network 30 to forward incoming telephone calls to the telephone number of the VoIP gateway 20 via the VoIP telephone network 25. To disable the forwarding of telephone calls, the handset may 10 send a command to the mobile telephone network 30 instructing the mobile telephone network 30 to cancel the forwarding of telephone calls.

In a further example embodiment where the data traffic comprises telephony traffic, telephone calls may be forwarded from the mobile telephone network 30 to the VoIP telephone network 25 when the handset 10 is within the range of the local network 15. In addition, telephone calls may be forwarded from the VoIP telephone network 25 to the mobile telephone network 30 when the handset is outside of the range of the local network 15.

To enable the forwarding of telephone calls from the mobile telephone network 30 to the VoIP telephone network 25, the handset 10 may first request the telephone number of the VoIP gateway 20, and then send a command to the mobile telephone network 30 instructing the mobile telephone network 30 to forward incoming telephone calls to a telephone number of the VoIP gateway 20 via the VoIP telephone network 25. To enable the forwarding of telephone calls from the VoIP telephone network 25 to the mobile telephone network 30, the handset may 10 send a command to the VoIP telephone network 25 instructing the VoIP telephone network 25 to forward incoming telephone calls to a telephone number of the mobile handset 10 via the mobile telephone network 30.

Once within range of the local network 15, the mobile handset 10 and the VoIP gateway 20 enter "cordless phone" mode. In this mode, the mobile handset is associated with one of the telephone numbers associated with the VoIP gateway 20. This telephone number is be the same phone number that the handset 10 instructed the mobile network to forward incoming telephone calls to. Incoming telephone calls for that phone number result in ringing of the mobile handset 10, as well as any other phones wired into the VoIP gateway 20 on that line. Calls can be received or initiated on that line with either the mobile handset 10 or the wired phones connected to that line. Incoming calls to either the mobile handset's phone number or the VoIP gateway's phone number will result in ringing of all phones connected to that VoIP line, including the mobile handset 10.

Those skilled in the art will appreciate that implementation of the present invention may involve the addition of a local wireless network interface to the VoIP gateway 20 and the mobile handset 10. It may also involve the addition of new firmware in both the VoIP gateway 20 and the mobile handset 10 that applies the appropriate logic enable and disable call forwarding and to utilize the local wireless network in a "cordless phone" mode, as described above.

The local network 15 may comprise at least one of a Bluetooth™ wireless network, an IEEE 802.11b wireless network, an IEEE 802.11a wireless network, an IEEE 802.11g wireless network, an IEEE 802.11h wireless network, an IEEE 802.11e wireless network, a Digital Enhanced Cordless Telecommunications (DECT) wireless network, a 900 MHz Cordless Telephone wireless network, a 2.4 GHz Cordless telephone wireless network, a HomeRF™ wireless network, a Home Phone Line Networking Alliance (HPNA) wired network, a Home Plug™ wired network, a 10/100BaseT Ethernet wired network, a USB wired network, and an IEEE 1394 wired network. Those skilled in the art will recognize that the invention may be implemented using virtually any type of local area network protocol currently existing or to be developed in the future.

The VoIP telephone network 25 may comprise a broadband IP network.

Figure 3:
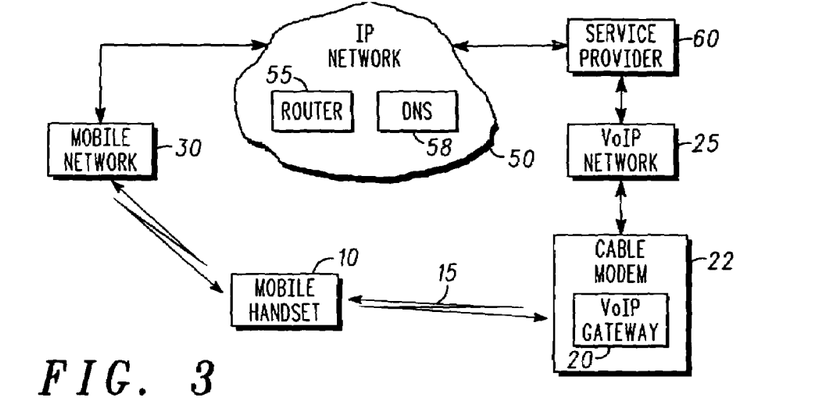
FIG. 3 shows a block diagram of a further example embodiment of the invention.

An example embodiment where the data traffic comprises Internet Protocol (IP) data traffic is shown in FIG. 3. The IP data traffic (from IP network 50) may be forwarded from the mobile telephone network 30 to the VoIP telephone network 25 when the handset 10 is within range of the local network 15. IP routers 55 may be notified of a new route for the handset's IP address to enable the forwarding of the IP data traffic via the VoIP telephone network 25.

In a further example embodiment, the handset 10 may dynamically assigned a new IP address on an IP subnet of the VoIP gateway 20. IP network domain name servers (DNS) 58 may be dynamically updated with a new mapping of a Fully Qualified Domain Name (DQDN) for the new IP address of the handset 10.

The IP data traffic enables at least one of email, instant messaging, pager functions, dispatch functions (e.g., two-way communications such as "push-to-talk" and "walkie-talkie" functions), Internet browsing, advertisements, e-commerce transactions, and similar features at the handset 10, which features may be provided and controlled by a service provider 60.

The handset 10 may be authenticated when the handset is determined to be within the range of the local network 15. The handset 10 may be determined to be out of range of the local network 15 when one of (1) the handset 10 is a predetermined distance from a wireless local network 15; (2) the handset is disconnected from a wired local network 15'; (3) a failure occurs in the VoIP telephone network 25; or (4) a failure occurs in the local network 15, 15'. The algorithms in the mobile handset 10 and the VoIP gateway 20 that perform recognition and authentication of the mobile handset on the local network can 15 also be used to enable routing of Internet Protocol (IP) data traffic to a from the mobile handset via the local network 15. When the mobile handset 10 is in the range of the local network 15, it performs all IP data communications via the local network 15 to the VoIP gateway 20. Other packetized data protocols, such as paging, could be similarly treated by encapsulating them in an IP format.

The handset 10 may be enabled to control residential systems, including for example a home computer, a security system, an audio system, a audiovisual system, a television appliance, an Internet appliance, a heating and cooling system, a lighting system, and the like.

Figure 4:
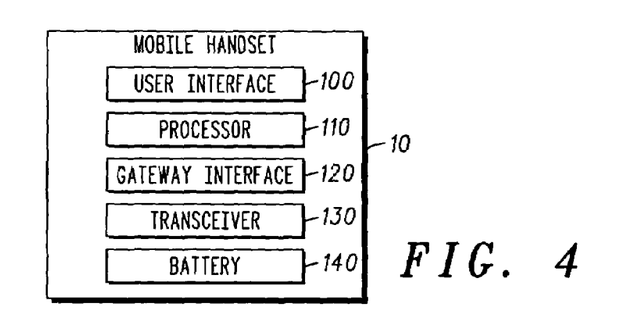
FIG. 4 shows a block diagram of an example mobile handset in accordance with the invention.

An example embodiment of a mobile handset 10 for accessing mobile and voice over IP (VoIP) telephone networks in accordance with the invention is shown in FIG. 4. The mobile handset 10 includes a rechargeable battery 140 and a user interface 100 as is known in the art. A gateway interface 120 is provided for communicating with a local network of a VoIP gateway of the VoIP telephone network (as shown in FIGS. 1-3). A transceiver 130 enabled for communication with the mobile telephone network and the VoIP telephone network is provided. A processor 110 is provided for determining whether the mobile handset 10 is within range of the local network. If the handset 10 is within the range of the local network, data traffic may be routed to and from the handset 10 via the VoIP telephone network. If the handset 10 is outside of the range of the local network, data traffic may be routed to and from the handset 10 via the mobile telephone network, as discussed above in connection with FIGS. 1-3.

The local network 15 may comprise one of a wired local network or a wireless local network. The processor 110 may determine that the handset 10 is within range of the local network 15 when the handset 10 is either physically connected to the wired local network or within a predetermined distance of the wireless local network.

The data traffic may comprise at least one of telephony data traffic and Internet protocol (IP) data traffic. In an example embodiment where the data traffic comprises telephony traffic, telephone calls may be forwarded from the mobile telephone network 30 to the VoIP telephone network 25 when the handset 10 is within the range of the local network 15. The forwarding of telephone calls may be disabled when the handset 10 is outside the range of the local network.

The processor 110 may enable forwarding telephone calls from the mobile telephone network 30 to the VoIP telephone network 25 by first requesting the telephone number of the VoIP gateway 20, and then sending a command to the mobile telephone network 30 instructing the mobile telephone network 30 to forward incoming telephone calls to the telephone number of the VoIP gateway 20 via the VoIP telephone network 25. The processor 110 may disable the forwarding of telephone calls by sending a command to the mobile telephone network 30 from the handset 10 instructing the mobile telephone network 30 to cancel the forwarding of telephone calls.

In a further example embodiment where the data traffic comprises telephony traffic, telephone calls may be forwarded from the mobile telephone network 30 to the VoIP telephone network 25 when the handset is within the range of the local network 15. Further, telephone calls may be forwarded from the VoIP telephone network 25 to the mobile telephone network 30 when the handset 15 is outside of the range of the local network 15.

The processor 110 may enable forwarding telephone calls from the mobile telephone network 30 to the VoIP telephone network 25 by first requesting the telephone number of the VoIP gateway 20, and then sending a command to the mobile telephone network 30 instructing the mobile telephone network 30 to forward incoming telephone calls to a telephone number of the VoIP gateway 20 via the VoIP telephone network 15. The processor 110 may enable forwarding telephone calls from the VoIP telephone network 25 to the mobile telephone network 30 by sending a command to the VoIP telephone network 25 instructing the VoIP telephone network 25 to forward incoming telephone calls to a telephone number of the mobile handset 10 via the mobile telephone network 30.

In an example embodiment where the data traffic comprises Internet Protocol (IP) data traffic, the IP data traffic may be forwarded from the mobile telephone network 30 to the VoIP telephone network 25 when the handset is within range of the local network 15. IP routers 55 may be notified of a new route for the handset's IP address to enable the forwarding of the IP data traffic via the VoIP telephone network 25. Alternatively, the handset 10 may be dynamically assigned a new IP address on an IP subnet of the VoIP gateway 20. IP network domain name servers 58 may then be dynamically updated with a new mapping of a Fully Qualified Domain Name (DQDN) for the new IP address of the handset 10.

The handset 10 may be authenticated when the handset 10 is determined to be within the range of the local network. The processor 110 may determine that the handset 10 is out of range of the local network 15 when one of (1) the handset is a predetermined distance from a wireless local network 15; (2) the handset is disconnected from a wired local network 15'; (3) a failure occurs in the VoIP telephone network 25; or (4) a failure occurs in the local network 30.

Figure 5:
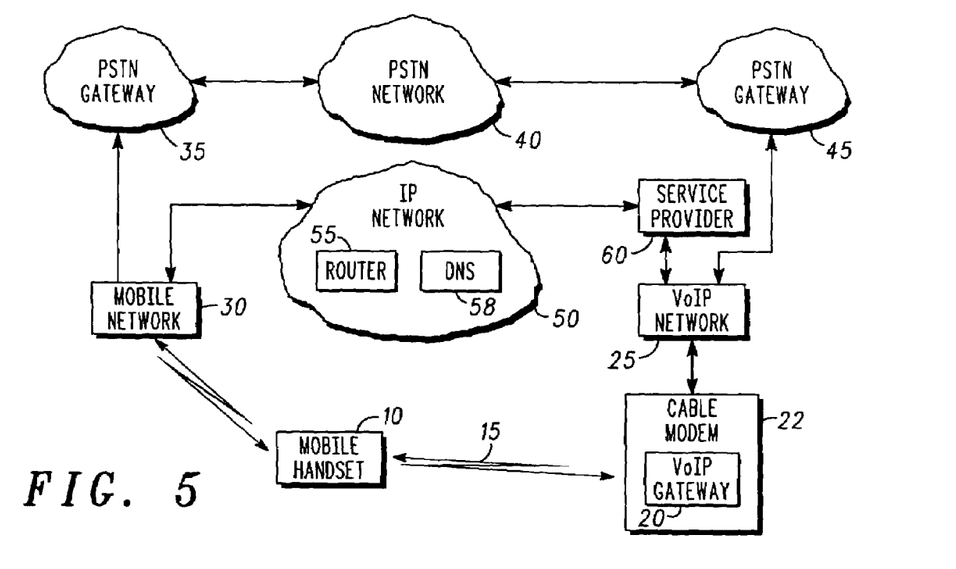
FIG. 5 shows a block diagram of a further example embodiment of the invention.

Those skilled in the art will appreciate that the features of the invention described in connection with FIGS. 1 and 2 relating to the routing of telephony data traffic may be combined with the features of the invention as described in connection with FIG. 3 relating to the routing of IP data traffic. A system having such combined features is shown in FIG. 5. With the example embodiment of the invention shown in FIG. 5, the functionality of the components remains as discussed above. In such an embodiment, the mobile telephone network 30 and the VoIP network 25 may both be configured to route telephony data traffic to the PSTN network 40 and IP data traffic to the IP network 50.

Corresponding methods are also provided in accordance with the invention.

One example implementation in accordance the invention for integrating mobile handsets with an HFC-based VoIP gateway for residential use may utilize Bluetooth™ wireless protocol to connect the handset 10 to the VoIP gateway 20. When the handset 10 detects the presence of a Bluetooth™ access point, it attempts to connect to it. If the VoIP gateway 20 accepts the connection (based on authentication of the handset 10), then the handset 10 automatically sends a command to the mobile telephone network 30 instructing it to enable call forwarding to one of the VoIP gateway's phone numbers. When an incoming call for the mobile handset 10 is processed by the mobile telephone network 30, it automatically forwards the call to the VoIP gateway 20, which in turn rings the handset 10 (and possibly other wired phones in the home). Calls may be processed between the handset 10 and the VoIP Gateway 20 using the Bluetooth™ Cordless Phone Profile. When the handset 10 is moved out of range of the VoIP gateway's Bluetooth™ link, the handset 10 may then send a command to the mobile telephone network 30 instructing it to cancel call forwarding. At that point, the handset 10 operates as a normal mobile phone. Optionally, the VoIP gateway 20 can send a message to the call control entity in the VoIP telephone network 25 instructing it enable call forwarding of one or more of it's phone numbers to the mobile handset's phone number. In this way, the subscriber can receive all calls at his mobile handset 10 destined either for that handset 10 or his residential phone numbers (i.e. the VoIP gateway's phone numbers). Additionally, the automatic control of call forwarding may be used by the handset 10 to facilitate the use of the mobile telephony network 30 as a backup network to the VoIP telephone network 25 in case of communication failure. For example, if portions of the VoIP telephone network 25 do not have backup powering and there is a power failure in the network, then VoIP communications between the VoIP gateway 20 and the rest of the VoIP telephone network 25 will be disrupted. Upon discovery of the failed communications link, the VoIP gateway may send a status message to the handset 10 indicating that the VoIP telephone network 25 is "off-line." In response, the handset 10 would send a command to the mobile telephone network 30 instructing it to disable call forwarding. The mobile handset 10 will then operate as a normal mobile handset, and the subscriber would not realize a disruption of telephony service.

Suitable handsets for implementing the present invention include, for example, those manufactured by Motorola, Inc. and other mobile telephony devices that operate in a network that supports call forwarding and have a local network interface to a VoIP Gateway. For example, Motorola, Inc. currently has available mobile handsets that have a Bluetooth™ wireless local network interface. Certain of Motorola's iDEN handsets also include a Bluetooth™ interface. Note, however that this invention is not limited to a mobile handset with Bluetooth™ and may include handsets having other wireless interfaces as discussed above. This invention applies to a mobile handset with any local network interface that supports voice and data traffic.

This invention may also be implemented using Motorola VoIP Telephony gateway products that support a local network interface. For example, it applies to Motorola's SB4500 and it's successors, the Centric 1220 and it's successors, as well as other similar products. As stated above, a wireless or wired local network interface can be used.

It is noted that the above description of the invention should in no way be interpreted as limiting the scope of the present invention as other alternative embodiments are contemplated. In addition to the above, there are other features of the invention, such as secure e-commerce transactions via the handset using the inherent authentication and security mechanisms present in the HFC network infrastructure, control of apparatus connected to the VoIP gateway via the local home network and unified billing approaches which can be implemented.

It should now be appreciated that the present invention provides advantageous methods, systems, and apparatus for accessing a mobile telephone network and a VoIP telephone network with a mobile handset, depending on the location of the handset.

Although the invention has been described in connection with various illustrated example embodiments, numerous modifications and adaptations may be made thereto without departing from the spirit and scope of the invention as set forth in the claims.

What is claimed is:

1. A method for accessing mobile and voice over Internet Protocol (VoIP) telephone networks with a mobile handset, comprising the steps of:

determining whether the mobile handset is within range of a local network of a VoIP gateway of a VoIP telephone network;

if said handset is within the range of the local network, routing data traffic to and from said handset via the VoIP telephone network; and if said handset is outside of the range of the local network, routing data traffic to and from said handset via the mobile telephone network.

2. A method in accordance with claim 1, wherein:
the local network comprises one of a wired local network or a wireless local network; and
the handset is determined to be within range of the local network when the handset is either physically connected to the wired local network or within a predetermined distance of the wireless local network.

3. A method in accordance with claim 1, wherein said data traffic comprises at least one of telephony data traffic and Internet protocol (IP) data traffic.

4. A method in accordance with claim 1, wherein said data traffic comprises telephony traffic, further comprising:
forwarding telephone calls from the mobile telephone network to the VoIP telephone network when the handset is within the range of the local network; and
disabling said forwarding of telephone calls when the handset is outside the range of the local network.

5. A method in accordance with claim 4, wherein:
the step of forwarding telephone calls from the mobile telephone network to the VoIP telephone network further comprises:
requesting the telephone number of the VoIP gateway by the handset; and
sending a command to the mobile telephone network from the handset instructing the mobile telephone network to forward incoming telephone calls to the telephone number of the VoIP gateway via the VoIP telephone network.

6. A method in accordance with claim 4, wherein:
the step of disabling said forwarding of telephone calls further comprises:
sending a command to the mobile telephone network from the handset instructing the mobile telephone network to cancel said forwarding of telephone calls.

7. A method in accordance with claim 1, wherein said data traffic comprises telephony traffic, further comprising:
forwarding telephone calls from the mobile telephone network to the VoIP telephone network when the handset is within the range of the local network; and
forwarding telephone calls from the VoIP telephone network to the mobile telephone network when the handset is outside of the range of the local network.

8. A method in accordance with claim 7, wherein:
the step of forwarding telephone calls from the mobile telephone network to the VoIP telephone network further comprises:
requesting the telephone number of the VoIP gateway by the handset; and
sending a command to the mobile telephone network from the handset instructing the mobile telephone network to forward incoming telephone calls to a telephone number of the VoIP gateway via the VoIP telephone network.

9. A method in accordance with claim 7, wherein:
the step of forwarding telephone calls from the VoIP telephone network to the mobile telephone network further comprises:
sending a command to the VoIP telephone network from the handset instructing the VoIP telephone network to forward incoming telephone calls to a telephone number of the mobile handset via the mobile telephone network.

10. A method in accordance with claim 1, wherein said local network comprises at least one of a Bluetooth™ wireless network, an IEEE 802.11b wireless network, an IEEE 802.11a wireless network, an IEEE 802.11g wireless network, an IEEE 802.11h wireless network, an IEEE 802.11e wireless network, a Digital Enhanced Cordless Telecommunications (DECT) wireless network, a 900 MHz Cordless Telephone wireless network, a 2.4 GHz Cordless telephone wireless network, a HomeRF™ wireless network, a Home Phone Line Networking Alliance (HPNA) wired network, a Home Plug™ wired network, a 10/100BaseT Ethernet wired network, a USB wired network, and an IEEE 1394 wired network.

11. A method in accordance with claim 1, wherein said data traffic comprises Internet protocol (IP) data traffic, further comprising:
forwarding said IP data traffic from said mobile telephone network to said VoIP telephone network when the handset is within range of the local network.

12. A method in accordance with claim 11, further comprising:
notifying IP routers of a new route for the handset's IP address to enable said forwarding of said IP data traffic via the VoIP telephone network.

13. A method in accordance with claim 11, further comprising:
dynamically assigning to the handset a new IP address on an IP subnet of the VoIP gateway; and
dynamically updating IP network domain name servers with a new mapping of a Fully Qualified Domain Name (DQDN) for the new IP address of the handset.

14. A method in accordance with claim 11, wherein said IP data traffic enables at least one of email, instant messaging, pager functions, dispatch functions, Internet browsing, advertisements, and e-commerce transactions.

15. A method in accordance with claim 1, further comprising:
authenticating said handset when said handset is determined to be within the range of the local network.

16. A method in accordance with claim 1, wherein said handset is determined to be out of range of said local network when one of (1) the handset is a predetermined distance from a wireless local network; (2) the handset is disconnected from a wired local network; (3) a failure occurs in the VoIP telephone network; or (4) a failure occurs in the local network.

17. A method in accordance with claim 1, further comprising:
enabling the handset to control residential systems.

18. A method in accordance with claim 17, wherein said residential systems comprise at least one of a home computer, a security system, an audio system, a audiovisual system, a television appliance, an Internet appliance, a heating and cooling system, and a lighting system.

19. A method in accordance with claim 1, wherein said VoIP telephone network comprises a broadband IP network.

20. A system for accessing mobile and voice over Internet Protocol (VoIP) telephone networks with a mobile handset, comprising:
a VoIP gateway for the VoIP telephone network;
a local network for connecting the handset to the VoIP gateway; and
a mobile handset enabled to determine whether the mobile handset is within range of the local network; wherein:
if said handset is within the range of the local network, data traffic is routed to and from said handset via the VoIP telephone network; and
if said handset is outside of the range of the local network, data traffic is routed to and from said handset via the mobile telephone network.

21. System in accordance with claim 20, wherein:
the local network comprises one of a wired local network or a wireless local network; and
the handset is determined to be within range of the local network when the handset is either physically connected to the wired local network or within a predetermined distance of the wireless local network.

22. System in accordance with claim 20, wherein said data traffic comprises at least one of telephony data traffic and Internet protocol (IP) data traffic.

23. System in accordance with claim 20, wherein:
said data traffic comprises telephony traffic;
telephone calls are forwarded from the mobile telephone network to the VoIP telephone network when the handset is within the range of the local network; and
said forwarding of telephone calls is disabled when the handset is outside the range of the local network.

24. System in accordance with claim 23, wherein:
to enable said forwarding of telephone calls from the mobile telephone network to the VoIP telephone network, the handset (1) requests the telephone number of the VoIP gateway, and (2) sends a command to the mobile telephone network instructing the mobile telephone network to forward incoming telephone calls to the telephone number of the VoIP gateway via the VoIP telephone network.

25. System in accordance with claim 23, wherein:
to disable said forwarding of telephone calls, the handset sends a command to the mobile telephone network instructing the mobile telephone network to cancel said forwarding of telephone calls.

26. System in accordance with claim 20, wherein:
said data traffic comprises telephony traffic;
telephone calls are forwarded from the mobile telephone network to the VoIP telephone network when the handset is within the range of the local network; and
telephone calls are forwarded from the VoIP telephone network to the mobile telephone network when the handset is outside of the range of the local network.

27. System in accordance with claim 26, wherein:
to enable the forwarding of telephone calls from the mobile telephone network to the VoIP telephone network, the handset (1) requests the telephone number of the VoIP gateway, and (2) sends a command to the mobile telephone network instructing the mobile telephone network to forward incoming telephone calls to a telephone number of the VoIP gateway via the VoIP telephone network.

28. System in accordance with claim 26, wherein:
to enable the forwarding of telephone calls from the VoIP telephone network to the mobile telephone network, the handset sends a command to the VoIP telephone network instructing the VoIP telephone network to forward incoming telephone calls to a telephone number of the mobile handset via the mobile telephone network.

29. System in accordance with claim 20, wherein said local network comprises at least one of a Bluetooth™ wireless network, an IEEE 802.11b wireless network, an IEEE 802.11a wireless network, an IEEE 802.11g wireless network, an IEEE 802.11h wireless network, an IEEE 802.11e wireless network, a Digital Enhanced Cordless Telecommunications (DECT) wireless network, a 900 MHz Cordless Telephone wireless network, a 2.4 GHz Cordless telephone wireless network, a HomeRF™ wireless network, a Home Phone Line Networking Alliance (HPNA) wired network, a Home Plug™ wired network, a 10/100BaseT Ethernet wired network, a USB wired network, and an IEEE 1394 wired network.

30. System in accordance with claim 20, wherein:
said data traffic comprises Internet Protocol (IP) data traffic;
said IP data traffic is forwarded from said mobile telephone network to said VoIP telephone network when the handset is within range of the local network.

31. System in accordance with claim 30, wherein:
IP routers are notified of a new route for the handset's IP address to enable said forwarding of said IP data traffic via the VoIP telephone network.

32. System in accordance with claim 30, wherein:
the handset is dynamically assigned a new IP address on an IP subnet of the VoIP gateway; and
IP network domain name servers are dynamically updated with a new mapping of a Fully Qualified Domain Name (DQDN) for the new IP address of the handset.

33. System in accordance with claim 30, wherein said IP data traffic enables at least one of email, instant messaging, pager functions, dispatch functions, Internet browsing, advertisements, and e-commerce transactions.

34. System in accordance with claim 20, wherein:
said handset is authenticated when said handset is determined to be within the range of the local network.

35. System in accordance with claim 20, wherein said handset is determined to be out of range of said local network when one of (1) the handset is a predetermined distance from a wireless local network; (2) the handset is disconnected from a wired local network; (3) a failure occurs in the VoIP telephone network; or (4) a failure occurs in the local network.

36. System in accordance with claim 20, wherein:
the handset is enabled to control residential systems.

37. System in accordance with claim 36, wherein said residential systems comprise at least one of a home computer, a security system, an audio system, a audiovisual system, a television appliance, an Internet appliance, a heating and cooling system, and a lighting system.

38. System in accordance with claim 20, wherein said VoIP telephone network comprises a broadband IP network.

39. A mobile handset for accessing mobile and voice over Internet Protocol (VoIP) telephone networks, comprising:
a rechargeable battery;
a user interface;
a gateway interface for communicating with a local network of a VoIP gateway of the VoIP telephone network;
a transceiver enabled for communication with said mobile telephone network and said VoIP telephone network;
a processor for determining whether the mobile handset is within range of the local network, wherein:
if said handset is within the range of the local network, data traffic is routed to and from said handset via the VoIP telephone network; and
if said handset is outside of the range of the local network, data traffic is routed to and from said handset via the mobile telephone network.

40. A handset in accordance with claim 39, wherein:
the local network comprises one of a wired local network or a wireless local network; and
the processor determines that the handset is within range of the local network when the handset is either physically connected to the wired local network or within a predetermined distance of the wireless local network.

41. A handset in accordance with claim 39, wherein said data traffic comprises at least one of telephony data traffic and Internet protocol (IP) data traffic.

42. A handset in accordance with claim 39, wherein:
said data traffic comprises telephony traffic;
telephone calls are forwarded from the mobile telephone network to the VoIP telephone network when the handset is within the range of the local network; and
said forwarding of telephone calls is disabled when the handset is outside the range of the local network.

43. A handset in accordance with claim 42, wherein:
the processor enables forwarding telephone calls from the mobile telephone network to the VoIP telephone network by (1) requesting the telephone number of the VoIP gateway, and (2) sending a command to the mobile telephone network instructing the mobile telephone network to forward incoming telephone calls to the telephone number of the VoIP gateway via the VoIP telephone network.

44. A handset in accordance with claim 42, wherein:
the processor disables said forwarding of telephone calls by sending a command to the mobile telephone network from the handset instructing the mobile telephone network to cancel said forwarding of telephone calls.

45. A handset in accordance with claim 39, wherein:
said data traffic comprises telephony traffic;
telephone calls are forwarded from the mobile telephone network to the VoIP telephone network when the handset is within the range of the local network; and
telephone calls are forwarded from the VoIP telephone network to the mobile telephone network when the handset is outside of the range of the local network.

46. A handset in accordance with claim 45, wherein:
the processor enables forwarding telephone calls from the mobile telephone network to the VoIP telephone network by (1) requesting the telephone number of the VoIP gateway, and (2) sending a command to the mobile telephone network instructing the mobile telephone network to forward incoming telephone calls to a telephone number of the VoIP gateway via the VoIP telephone network.

47. A handset in accordance with claim 45, wherein:
the processor enables forwarding telephone calls from the VoIP telephone network to the mobile telephone network by sending a command to the VoIP telephone network instructing the VoIP telephone network to forward incoming telephone calls to a telephone number of the mobile handset via the mobile telephone network.

48. A handset in accordance with claim 39, wherein said local network comprises one of a Bluetooth™ wireless network, an IEEE 802.11b wireless network, an IEEE 802.11a wireless network, an IEEE 802.11g wireless network, an IEEE 802.11h wireless network, an IEEE 802.11e wireless network, a Digital Enhanced Cordless Telecommunications (DECT) wireless network, a 900 MHz Cordless Telephone wireless network, a 2.4 GHz Cordless telephone wireless network, a HomeRF™ wireless network, a Home Phone Line Networking Alliance (HPNA) wired network, a Home Plug™ wired network, a 10/100BaseT Ethernet wired network, a USB wired network, and an IEEE 1394 wired network.

49. A handset in accordance with claim 39, wherein:
said data traffic comprises Internet Protocol (IP) data traffic;
said IP data traffic is forwarded from said mobile telephone network to said VoIP telephone network when the handset is within range of the local network.

50. A handset in accordance with claim 49, wherein:
IP routers are notified of a new route for the handset's IP address to enable said forwarding of said IP data traffic via the VoIP telephone network.

51. A handset in accordance with claim 49, wherein:
the handset is dynamically assigned a new IP address on an IP subnet of the VoIP gateway; and
IP network domain name servers are dynamically updated with a new mapping of a Fully Qualified Domain Name (DQDN) for the new IP address of the handset.

52. A handset in accordance with claim 49, wherein said IP data traffic enables at least one of email, instant messaging, pager functions, dispatch functions, Internet browsing, advertisements, and e-commerce transactions.

53. A handset in accordance with claim 39, wherein:
said handset is authenticated when said handset is determined to be within the range of the local network.

54. A handset in accordance with claim 39, wherein said processor determines that the handset is out of range of said local network when one of (1) the handset is a predetermined distance from a wireless local network; (2) the handset is disconnected from a wired local network; (3) a failure occurs in the VoIP telephone network; or (4) a failure occurs in the local network.

55. A handset in accordance with claim 39, wherein:
the handset is enabled to control residential systems.

56. A handset in accordance with claim 55, wherein said residential systems comprise at least one of a home computer, a security system, an audio system, a audiovisual system, a television appliance, an Internet appliance, a heating and cooling system, and a lighting system.

57. A handset in accordance with claim 39, wherein said VoIP telephone network comprises a broadband IP network.

* * * * *

UNITED STATES PATENT AND TRADEMARK OFFICE
CERTIFICATE OF CORRECTION

PATENT NO. : 7,460,525 B2
APPLICATION NO. : 10/180988
DATED : December 2, 2008
INVENTOR(S) : Richard Moore, Jr.

Page 1 of 1

It is certified that error appears in the above-identified patent and that said Letters Patent is hereby corrected as shown below:

COLUMN 3:
Line 19: After "like", please insert --.--
Line 39: After "like)", please insert --.--

COLUMN 5:
Line 42: Please delete "(DQDN)" and replace with --(FQDN)--
Line 66: Please delete "similarily" and replace with --similarly--

COLUMN 7:
Line 16: Please delete "(DQDN)" and replace with --(FQDN)--

COLUMN 10:
Line 29: In Claim 13, please delete "(DQDN)" and replace with --(FQDN)--

COLUMN 12:
Line 19: In Claim 32, please delete "(DQDN)" and replace with --(FQDN)--

COLUMN 14:
Line 24: In Claim 51, please delete "(DQDN)" and replace with --(FQDN)--

Signed and Sealed this

Twenty-fifth Day of August, 2009

David J. Kappos
*Director of the United States Patent and Trademark Office*